Dec. 11, 1951     G. E. HENNING     2,578,354
CONTINUOUS VULCANIZATION APPARATUS

Filed Nov. 30, 1949     4 Sheets-Sheet 1

INVENTOR
G. E. HENNING
BY *E. F. Kane*
ATTORNEY

Dec. 11, 1951 G. E. HENNING 2,578,354
CONTINUOUS VULCANIZATION APPARATUS
Filed Nov. 30, 1949 4 Sheets-Sheet 2

INVENTOR
G. E. HENNING
BY *E. F. Kane*
ATTORNEY

Patented Dec. 11, 1951

2,578,354

UNITED STATES PATENT OFFICE 2,578,354

CONTINUOUS VULCANIZATION APPARATUS

George E. Henning, Baltimore, Md., assignor to Western Electric Company, Incorporated, New York, N. Y., a corporation of New York Application November 30, 1949, Serial No. 130,158

4 Claims. (Cl. 18—6)

This invention relates to apparatus for covering cable cores, or the like, with vulcanized jackets composed of compounds of rubber or similar vulcanizable materials, and more particularly to a vulcanizing chamber having an endless conveyor running therethrough for supporting a covered cable core during its passage through the vulcanizing chamber.

In the manufacture of cables comprising cores having coverings of rubber or rubber-like compounds vulcanized thereon, it has been found desirable to carry out the vulcanization in a straight vulcanizing chamber for the reason that it is undesirable to bend abruptly a core covered with a vulcanizable compound until the compound has become vulcanized fully. In the vulcanization of rubber or rubber-like compounds on a continuously advancing cable core in a straight vulcanizing chamber, it has been found that the covered core tends to sag due to the length of the cable in the vulcanizing chamber. This tendency is especially great with cable cores of large diameter due to their weight. It has been found that during the early stages of vulcanization, this sagging causes the covering to be dragged along the bottom of the vulcanizing chamber before the cover has been cured sufficiently to keep it from being chafed or scuffed by contact with the body of the vulcanizing chamber.

An object of the invention is to provide new and improved apparatus for covering cable cores, or the like, with vulcanized jackets.

Another object of this invention is to provide a conveyor for supporting the cable during its travel through a vulcanizing chamber and thereby eliminate undesirable chafing and scuffing of the outer covering.

A further object of the invention is to provide a straight vulcanizing chamber having improved seals at the entrance and exit ends thereof to accommodate the conveyor and the cable carried thereby.

One type of apparatus illustrating certain features of the invention may comprise a chain belt conveyor having cradles mounted thereon at intervals to support a covered cable core. A portion of the conveyor is enclosed within a straight vulcanizing chamber, the entrance and exit of the conveyor and the cable being accomplished by the use of seals at the entrance and exit ends of the vulcanizing chamber.

A complete understanding of the invention may be had by referring to the following detailed description, when read in conjunction with the accompanying drawings, wherein Figs. 1 and 2 considered together show a schematic diagram of a complete cable core covering system when Fig. 2 is placed to the left of Fig. 1;

Fig. 8 is an isometric view of one of the conveyor cradles; and

Fig. 9 is a cross-sectional view illustrating an alternate form of cradle which may be used with the invention.

Figure 1:
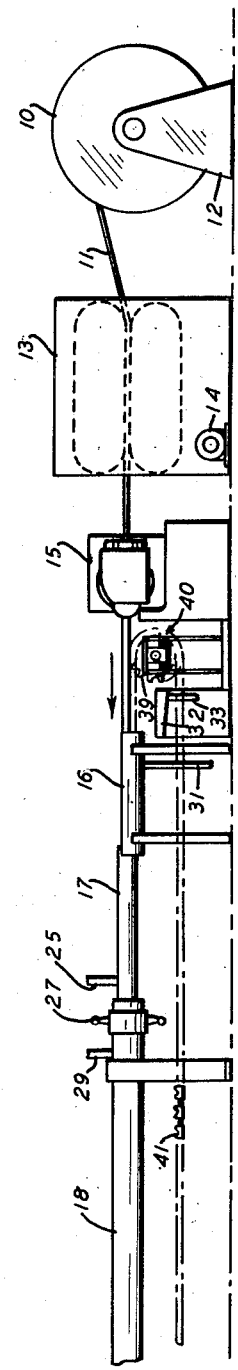
Figure 2:
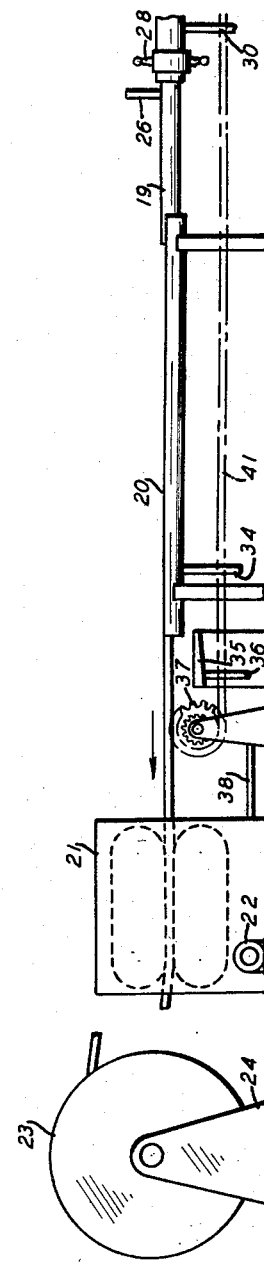

Referring now to Figs. 1 and 2, a supply reel 10, having a supply of cable core 11 thereon which is to be covered, is supported by standards 12. The core 11 is passed through a tractor capstan 13, which is driven by a motor 14, and the core 11 then passes through an extruder 15, wherein a covering of a vulcanizable rubber or rubber-like compound is extruded on the continuously moving core 11. After leaving the extruder 15, the covered cable core passes through a trough 16, a water seal 17, the entrance end of which rests in the trough 16, and into a vulcanizing chamber 18, wherein the covering is vulcanized on the core 11. The covered cable core then passes through an exit water seal 19, through an exit trough 20, which supports the exit end of the water seal 19, through a tractor capstan 21, which is driven by a motor 22, and thence to a takeup reel 23, which is supported by standards 24.

The water seal 17 is supplied with water under high pressure through a pipe 25 adjacent the entrance end of the vulcanizing chamber 18. The exit water seal 19 is, likewise, supplied with water under high pressure through a pipe 26 adjacent the exit end of the vulcanizing chamber 18. The water seals 17 and 19 are each connected to the vulcanizing chamber by means of quick-release type threaded joints 27 and 28, respectively. The vulcanizing chamber 18 is supplied with steam through an entrance pipe 29, and a pipe 30 is provided to drain off condensate to a suitable steam trap (not shown). The trough 16 is provided with a drain 31 and a drip pan 32 having a drain 33 and the exit trough 20, likewise, is provided with a drain 34 and with a drip pan 35 having a drain 36. A chain drive sprocket 37, which is suitably connected to be driven by an operating shaft 38 from the motor 22, and an idler sprocket 39 having a slack adjuster 40 suitably connected thereto, are so placed with relation to the vulcanizing chamber 18 and the water seals 17 and 19 as to support a chain-type conveyor 41, which, in turn, supports the covered cable core during its passage through the vulcanizing chamber 18.

Figure 3:
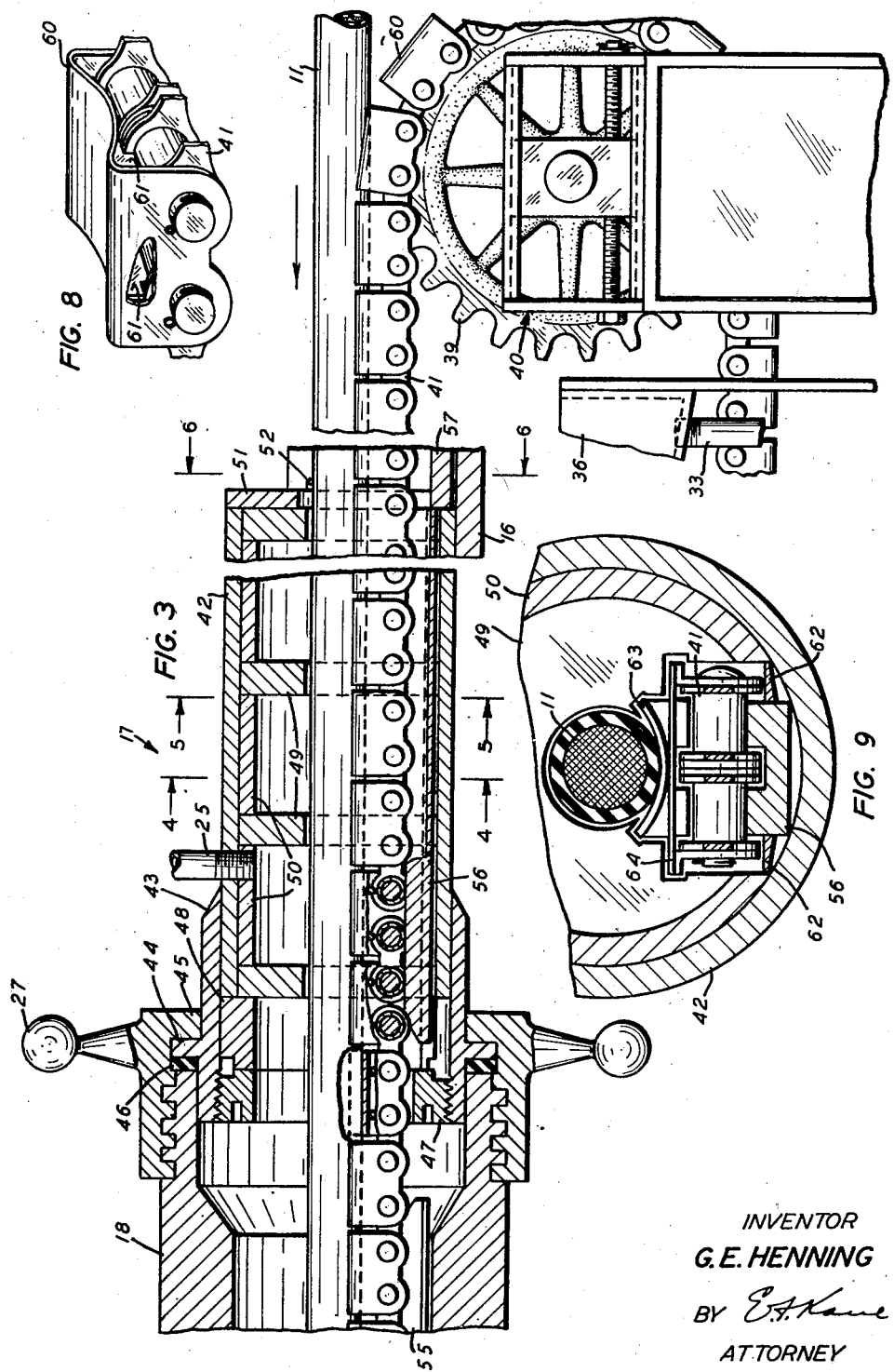
Fig. 3 shows a vertical sectional view of one of the two seals, means for securing the seals to the vulcanizing chamber, and a portion of the conveyor and idler sprocket.
Figure 4:
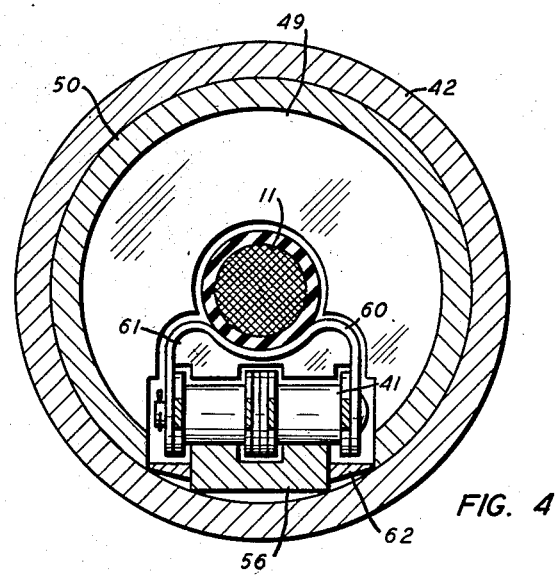
Fig. 4 is a cross-sectional view, through one of the seals, taken along the line 4—4 of Fig. 3.
Figure 7:
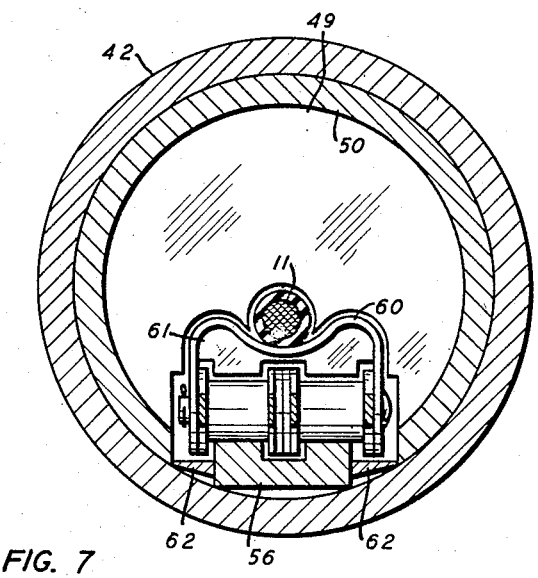
Fig. 7 is a cross-sectional view, similar to that of Fig. 4, but showing the necessary change in baffle plate design for a smaller diameter cable.
Figure 5:
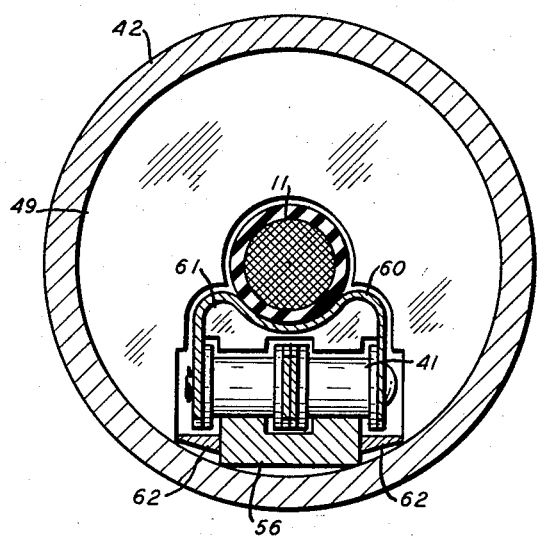
Fig. 5 is a cross-sectional view, through one of the seals, taken along line 5—5 of Fig. 3.
Figure 6:
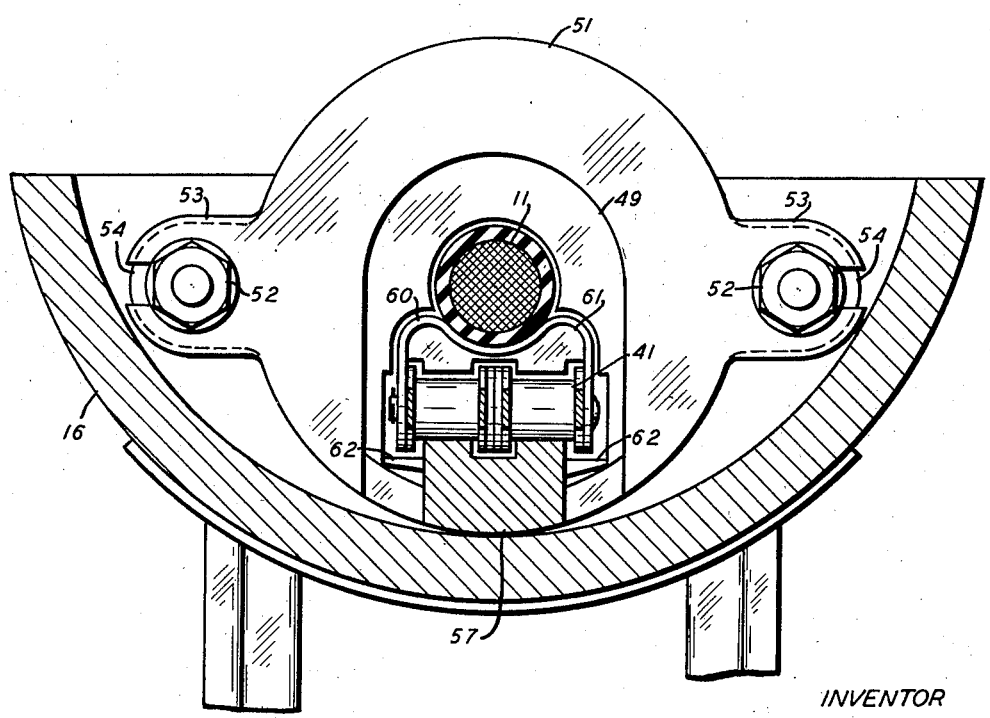
Fig. 6 is a cross-sectional view taken along the line 6—6 of Fig. 3.

By reference to Fig. 3, it will be seen that the water seal 17 comprises a tube 42 which in effect constitutes an extension of the vulcanizing chamber 18. A sleeve 43, suitably secured to the tube 42, is provided with an annular outwardly extending shoulder 44 adapted to cooperate with an annular inwardly extending shoulder 45 on the water seal quick release 27, which in turn threadedly engages the end of the vulcanizing chamber 18. A suitable gasket 46 is positioned between the annular shoulder 44 on the sleeve 43 and the end of the vulcanizing chamber 18 thus to tightly seal the sleeve 43 and the tube 42 to the vulcanizing chamber 18. The sleeve 43 also has a holding nut 47 threadedly secured in the interior thereof, and the holding nut 47 serves to position an abutment spacer 48 against the end of the tube 42. The abutment spacer 48 in turn properly positions a series of baffles 49 and spacers 50 which are alternately placed within the tube 42 to form a labyrinth-type seal. The baffles 49 and spacers 50 are retained in position within the tube 42 by means of the abutment spacer 48 and a holding plate 51, which is suitably secured to the other end of the tube 42 by means of bolts 52 which engage lugs 53 formed on the holding plate 51 and cooperating lugs 54 formed on the tube 42. The abutment spacer 48, baffles 49, spacers 50 and the holding plate 51 are all of substantially horseshoe shaped configuration with the baffles 49 being so formed as to provide apertures therein just slightly larger than the conveyor chain 41 and covered cable core passing therethrough.

Since the conveyor chain 41, with a covered cable thereon, will tend to ride along the bottom of the water seals 17 and 19 and of the vulcanizing chamber 18, the bottom of the vulcanizing chamber 18 may be provided with a hardened stainless steel or other metallic wear plate 55, on which the lower side of the conveyor chain 41 may ride. Similar wear plates 56 may be provided in the water seals 17 and 19 and it is also desirable to provide wear plates 57 in the bottom of the troughs 16 and 20.

Referring to Fig. 8, it will be seen that each pair of links of the chain 41 has a cradle 60 secured thereto, the purpose of which is to support the covered cable core during its passage through the seals and vulcanizing chamber. Since it is desirable to maintain as completely as possible the sealing effect within the water seals 17 and 19, it is desirable to provide the cradles 60 with cradle end plates 61, the purpose of which is to maintain the seal as nearly water-tight as possible.

Referring to Figs. 4, 5, 6, 7 and 9, it will be seen that the wear plates 56 within the seals 17 and 19 are also provided with small positioning ribs 62, the purpose of which is to maintain the baffles 49 and spacers 50 in their proper position within the seals. Referring to Fig. 9, in particular, an alternate type of cradle is illustrated, wherein a concave cradle portion 63 is welded or otherwise suitably secured to a flat plate 64, carried by the conveyor chain 41.

It is to be observed that water under a pressure substantially equal to the pressure of the steam in the vulcanzing chamber 18 is introduced into the water seals 17 and 19 through the pipes 25 and 26 adjacent to the entrance and exit ends, respectively, of the vulcanizing chamber 18. The baffles 49 and spacers 50, therefore, provide chambers which reduce the pressure of the water introduced into the seals from a value about equal to or slightly less than the steam pressure at the end connected to the vulcanizing chamber 18 down substantially to atmospheric pressure at the other end of each seal.

While the conveyor described and shown in detail herein has been indicated as a sprocket and chain type conveyor, it is obvious that many other types of conveyor and conveyor-driving means might be employed. For example, a stainless steel belt having cradles welded thereon might be employed and the belt might be driven by a conventional driving sheave. It is also to be noted that although the water seal 17 has been shown as a single tube having baffles and spacers therein, it is entirely possible to use a split type tube hinged at one side. However, such is not necessary when a conveyor such as disclosed by applicant is used. It is to be understood that although only the water seal 17 has been shown in detail, a similar water seal 19 is employed at the other end of the vulcanizing chamber 18. For simplicity, only a portion of the conveyor and cradles has been shown in Fig. 3 in order that the construction of the water seal and quick-release mechanism may be more easily understood.

It is to be understood that the above-described arrangements are simply illustrative of the application of the principles of the invention. Numerous other arrangements may be readily devised by those skilled in the art which will embody the principles of the invention and fall within the spirit and scope thereof.

Since the vulcanizable covering extruded upon the cable core 11 is hot as it leaves the extruder 15, the water supplied to the entrance water seal 17 preferably is hot in order to prevent loss of the heat stored in the covering. The water introduced into the exit water seal 19 preferably is cold so that the vulcanized covering on the cable core 11 will be cooled during its passage therethrough. This has the effect of minimizing the formation of blisters on the covering and of toughening the covering before it reaches the atmosphere.

What is claimed is:

1. In continuous vulcanization apparatus wherein covers are vulcanized on large-size cable cores, the combination including an elongated vulcanizing chamber, means for introducing steam under pressure into said chamber, entrance and exit water seals at the ends of the vulcanizing chamber, means for introducing water under a pressure substantially the same as the steam pressure into the water seals, and an endless conveyor passing along a path extending through the entrance seal, the vulcanizing chamber and the exit seal and outside the seals and the chamber back to the entrance seal for supporting a covered cable core during its passage through the vulcanizing chamber, the portion of the conveyor supporting the covered cable core and the covered cable core having a predetermined combined cross-section, the entrance and exit seals having passages therethrough substantially complementary to that of the conveyor and the core at or at least one point along each seal.

2. In apparatus for continuously vulcanizing coverings on large size cable cores, and the like, the combination including a straight vulcanizing chamber, a water seal at the entrance end of said chamber, a water seal at the exit end of said chamber, an endless chain conveyor passing through the entrance seal, the vulcanizing chamber and the exit seal, a plurality of cradles carried by the chain conveyor, means for driving said conveyor to transport a covered cable core through said vulcanizing chamber, and a hardened metal track in the bottom of said vulcanizing chamber to support said chain conveyor during its course therethrough.

3. Apparatus for continuously vulcanizing coverings on large-size cable cores, and the like, which comprises a vulcanizing chamber, an endless conveyor for carrying the covered cable along the bottom of the vulcanizing chamber, a water seal positioned at one end of said chamber and consisting of alternately placed horseshoe shaped baffles and spacers, quick-acting threaded means for securing said seal to the end of said chamber, and hardened metal wear plates disposed in the bottom of said seal to support the conveyor during its passage through the seal to and from said chamber.

4. In an apparatus for continuously vulcanizing coverings on large cable cores, and the like, including means for extruding a vulcanizable covering on a cable core, an elongated vulcanizing chamber and means for introducing steam under a high pressure into the vulcanizing chamber, the improvement which comprises an endless conveyor passing through the vulcanizing chamber, a plurality of cradles secured to the carrier for supporting a covered cable core during its passage through said chamber, means for driving said conveyor, seals positioned at the entrance and exit ends of said chamber, and means for introducing water into said seals under a pressure substantially equal to the pressure of the steam in said chamber, each of said seals comprising a tubular member and a plurality of baffles spacedly positioned in said tubular member and having openings therein of a contour substantially the same as but slightly larger than the composite contour of said conveyor, said carriers and a covered cable core resting on said carriers.

GEORGE E. HENNING.

REFERENCES CITED

The following references are of record in the file of this patent:

UNITED STATES PATENTS

| Number | Name | Date |
|---|---|---|
| 277,019 | Eddy | May 8, 1883 |
| 842,356 | Stone | Jan. 29, 1907 |
| 1,860,411 | Glidden et al. | May 31, 1932 |
| 2,046,047 | Watkins | June 30, 1936 |
| 2,322,483 | Stricklen | June 22, 1943 |
| 2,438,003 | Edwards et al. | Mar. 16, 1948 |
| 2,533,335 | Wallace | Dec. 12, 1950 |

FOREIGN PATENTS

| Number | Country | Date |
|---|---|---|
| 864,121 | France | Jan. 8, 1941 |